United States Patent
Glen et al.

(10) Patent No.: US 7,522,125 B2
(45) Date of Patent: *Apr. 21, 2009

(54) WIRELESS DEVICE METHOD AND APPARATUS WITH DRAWING COMMAND THROTTLING CONTROL

(75) Inventors: David Glen, Toronto (CA); Edward G. Callway, Toronto (CA)

(73) Assignee: ATI International SRL, Christ Church (BB)

( * ) Notice: Subject to any disclaimer, the term of this patent is extended or adjusted under 35 U.S.C. 154(b) by 533 days.

This patent is subject to a terminal disclaimer.

(21) Appl. No.: 11/245,351

(22) Filed: Oct. 5, 2005

(65) Prior Publication Data

US 2006/0028399 A1    Feb. 9, 2006

Related U.S. Application Data

(62) Division of application No. 09/923,759, filed on Aug. 6, 2001, now Pat. No. 7,053,863.

(51) Int. Cl.
G09G 5/00 (2006.01)
(52) U.S. Cl. .......................... 345/2.3; 345/1.1; 345/2.1
(58) Field of Classification Search ............... 345/1.1–4, 345/156–169; 455/3.01–3.03, 68–73, 91–96
See application file for complete search history.

(56) References Cited

U.S. PATENT DOCUMENTS

| | | | |
|---|---|---|---|
| 5,708,961 | A | 1/1998 | Hylton et al. |
| 5,774,172 | A | 6/1998 | Kapell et al. |
| 6,008,777 | A | 12/1999 | Yiu |
| 6,263,503 | B1 | 7/2001 | Margulis |
| 6,292,172 | B1 | 9/2001 | Makhlouf |
| 6,771,704 | B1 | 8/2004 | Hannah |
| 2001/0052130 | A1 | 12/2001 | Yap et al. |
| 2001/0054060 | A1 | 12/2001 | Fillebrown et al. |
| 2002/0077979 | A1* | 6/2002 | Nagata ........................ 705/40 |
| 2002/0196378 | A1 | 12/2002 | Slobodin et al. |
| 2003/0027517 | A1* | 2/2003 | Callway et al. ............ 455/3.01 |

(Continued)

FOREIGN PATENT DOCUMENTS

EP     0710017 A2    5/1996

(Continued)

OTHER PUBLICATIONS

Duval, Mary; Potential Wireless Applications & Interfaces for Projectors; Display Interfaces 2001, Anaheim, CA; Mar. 2001.

(Continued)

*Primary Examiner*—Vijay Shankar
(74) *Attorney, Agent, or Firm*—Vedder Price P.C.

(57) ABSTRACT

A wireless drawing command transmitting unit includes a wireless transmitter operative to transmit drawing commands associated with a master image renderer. A wireless drawing command receiving unit includes a wireless receiver operative to receive the transmitted drawing commands and generates an image for a display device using the drawing commands transmitted wirelessly. In addition, the wireless drawing command receiving unit transmits drawing command throttle data back to the wireless drawing command transmitting unit to throttle transmission of drawing commands that are sent by the drawing command transmitting unit. A method for providing wireless display of images is also disclosed.

17 Claims, 5 Drawing Sheets

U.S. PATENT DOCUMENTS

2003/0071902 A1* 4/2003 Allen et al. ............ 348/211.11

FOREIGN PATENT DOCUMENTS

EP 0762751 A2 3/1997

OTHER PUBLICATIONS

Venugopal, Madan et al.; Display Interfaces for High-Quality Wireless Video; Display Interfaces 2001, Anaheim, CA; Mar. 2001.

Definition of "drawing program"; Microsoft Press Computer Dictionary, Third Editon; Microsoft Corporation; 1997; pp. 1-3.

* cited by examiner

WIRELESS DEVICE METHOD AND APPARATUS WITH DRAWING COMMAND THROTTLING CONTROL

RELATED CO-PENDING APPLICATIONS

This application is related to co-pending U.S. application Ser. No. 09/923,768 filed Aug.6, 2001, entitled "Wireless Display Apparatus and Method", having as inventors Edward G. Callway and David Glen, owned by instant assignee and incorporated herein by reference.

This application is a divisional of U.S. application Ser. No. 09/923,759 filed Aug. 6, 2001, now U.S. Pat. No. 7,053,863 entitled "Wireless Device Method and Apparatus With Drawing Command Throttling Control", having as inventors David Glen and Edward G. Callway, owned by instant assignee and incorporated herein by reference.

FIELD OF THE INVENTION

The present invention relates generally to methods and apparatus that communicate wireless image information for display, and more particularly to wireless display devices.

BACKGROUND OF THE INVENTION

Wireless accessories for computers and other portable information appliances have been available for many years. For example, wireless keyboards, wireless mice, wireless printers and wireless modems may be operatively coupled to a computing device through an infrared (IRDA) communication link or other suitable wireless communication link. In addition, wireless radio frequency standards are being developed, such as Bluetooth (see e.g., www.bluetooth.com), IEEE 802.15.1, IEEE 802.11b or other suitable RF standards for local area network devices. However, the display devices associated with such devices typically still use a wired cable connection to the device. This is due in part to the large amounts of data, such as video pixel data, that must be passed from a frame buffer containing a rendered image, to the display device which may be an LCD panel, other digital panel or high resolution display device. LCD projectors and wall displays also typically have a cable interconnection between the source of the image information and the display device.

In addition, it is known to use image renderers, such as graphics accelerator chips, containing, for example, two dimensional and three dimensional rendering engines that interface with a main processor, such as a host CPU, to generate and present graphics and video information, in the form of overlays, and other video graphics images. However, systems that employ image rendering devices typically have hard wired connections between the image renderer, such as a graphics accelerator chip or host CPU, and a display device, such as an LCD.

In display systems that employ multiple graphics accelerators to, for example, speed up the generation of a rendered image for video ames and other multimedia applications, each graphics accelerator generates a different part of the same image or a completely different image. As such, with dual graphics processor based systems, the operating system typically has to know that the two graphics accelerators exist, and the software drivers associated with the graphics accelerators have to know that another software driver associated with the other graphics accelerator exists so that they may be used to draw other portions of the same image. In addition, each of the two graphics accelerator chips typically cannot use the same memory space and avoid system resource conflicts. Accordingly, operating systems are typically modified to accommodate parallel graphics accelerator operation. Operating systems typically send drawing requests to two different software drivers associated with the two graphics accelerators alternate between line or image frame rendering. Moreover, such systems are not known that employ anything other than a wired connection to a monitor device. Accordingly, such systems may require special operating systems and can be cumbersome to use since they require additional cabling.

Other network-based systems are known that may have, for example, a console that sends drawings commands over a wired network connection to a network display terminal. Such systems may, for example, send different drawing commands to different network display terminals based on which user is associated with a given network display terminal. A special operating system is used to control different commands to the different network display terminals. Accordingly, such systems can require cabling requirements as well as special operating system control.

Accordingly, a need exists for a wireless display device and method that allows the removal of a wired display connection to allow additional flexibility in displaying images without requiring modification to the operating system or applications.

DETAILED DESCRIPTION OF A PREFERRED EMBODIMENT OF THE INVENTION

Figure 1A:
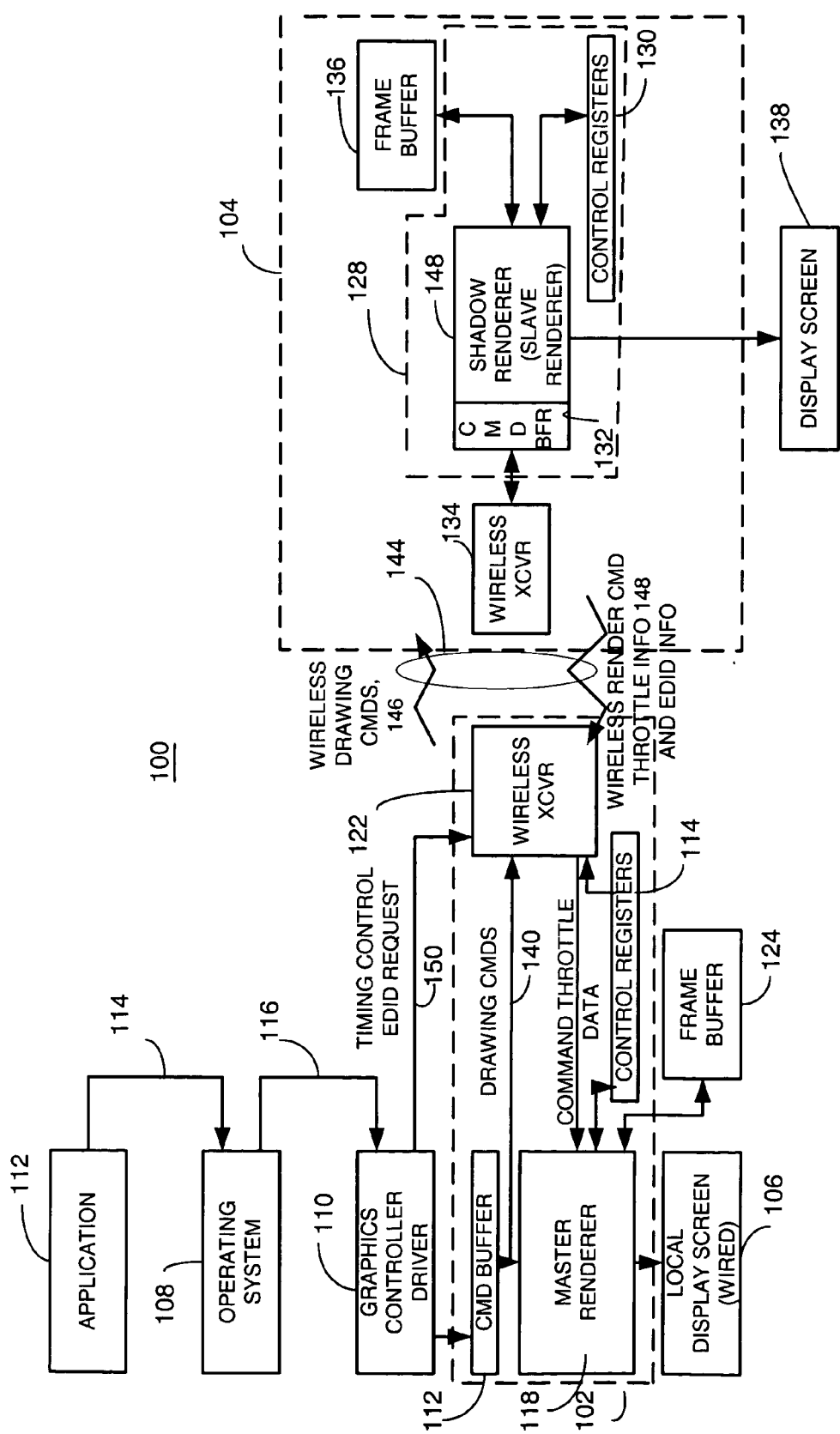
FIG. 1a is a block diagram illustrating one example of a wireless display device system in accordance with one embodiment of the invention.

A wireless drawing command transmitting unit includes a wireless transmitter operative to transmit drawing commands associated with an image renderer, such as a 2D/3D rendering engine. The drawing commands may be the commands issued through a display driver. The wireless transmitter receiver may be, for example, a radio frequency-based transmitter receiver such as a Bluetooth based system or any other suitable wireless system. A wireless display includes a wireless drawing command receiving unit and includes a wireless receiver operative to receive the transmitted drawing commands and generates an image for a display device using the drawing commands transmitted wirelessly. In addition, the wireless drawing command receiving unit transmits drawing command throttle data back to the wireless drawing command transmitting unit to throttle transmission of drawing commands that are sent by the drawing command transmitting unit. By way of example only, the wireless drawing command transmitting unit may be a portable or non-portable information display unit or data processing unit with a wireless transmitter and a graphics accelerator. The wireless drawing command receiving unit may be, for example, a wireless monitor with a second graphics accelerator and a wireless receiver. The wireless monitor uses the second graphics accelerator to render images defined by the wirelessly communicated drawing commands from the computing device, such as a portable or stationary computing device. Sending drawing commands can minimize the amount of wireless bandwidth required to display graphics and video images. In addition, the wireless monitor sends via a back channel, or in any other suitable way, drawing command throttle information to allow the portable computing device to throttle drawing commands to the wireless monitor so that the portable computing device and wireless monitor both concurrently display the same image, if the computing device has a display, which is optional.

In another embodiment, the wireless monitor may include a switch mode that can be used to switch between a wireless mode and a non-wireless mode such that the second graphics accelerator can be used as an independent rendering engine so that a different image, from the portable computing device can be displayed on the wireless monitor.

Accordingly, if desired, a wired display for a laptop computer, may display the same image as that displayed on a wireless display at the same time without sending rendered image data over the wireless link. Instead, drawing commands are communicated along with requisite synchronization information. In addition, a back channel is used by the wireless monitor to send command throttle data to speed up or slow down sent commands from the a first graphics accelerator, such as a master graphics accelerator.

In another embodiment, where a host processing device is used in addition to a graphics accelerator, for example, and wherein drawing (e.g., rendering) is performed by the host processor instead of the graphics accelerator, such as read and writes from a local frame buffer, the system sends write data that is sent to the local frame buffer also to the wireless monitor for storage in its frame buffer to keep frame buffer content in a remote frame buffer the same. Accordingly, host CPU writes are sent to and used by the wireless monitor.

FIG. 1a illustrates one example of a wireless display device system 100 that employs a wireless drawing command transmitting unit 102 and a wireless drawing command receiving unit 104. The wireless drawing command transmitting unit 102 may be, for example, a laptop computer, communication device, Internet appliance, display device, work station or any other suitable device that displays images. For purposes of illustration, and not limitation, the wireless drawing command transmitting unit 102 will be referred to as a laptop computer with a local (wired) display screen, such as an LCD 106. As such, the wireless drawing command transmitting unit 102 may have an associated operating system 108, a graphics controller driver 110 and one or more software applications, such as a presentation package, video game or any other suitable application which requires the use of drawing commands, such as high level drawing commands 114 sent from the application to the operating system. In addition, the operating system 108 sends high level drawing commands 116 to the graphics controller driver 110 as known in the art.

The wireless drawing command transmitting unit 102 may be, for example, a graphics accelerator chip having a master renderer 118, such as a 2D or 3D rendering engine, as known in the art. In addition, the wireless drawing command transmitting unit 102 includes a drawing command buffer 112, a set of drawing control registers 114, a short range wireless transceiver 122 and a frame buffer 124, which may be system memory or a local frame buffer as desired. The short range wireless transceiver 122 may be, for example, a radio frequency-based wireless transceiver such as one that operates according to the Bluetooth standard IEEE 802.15.1, IEEE 802.11b or other suitable RF standards, as known in the art, or any other suitable RF or optical wireless transceiver.

The wireless drawing command receiving unit 104 includes a shadow image renderer 128, such as another graphics accelerator of the same type as master renderer 118. The shadow image renderer 128 includes a set of drawing control registers 130, and a drawing command buffer 132. The wireless drawing command receiving unit 104 also includes a wireless transceiver 134 which is of the same type as wireless transceiver 122, and an additional frame buffer 136 along with a display screen 138. The display screen may be physically separate from the receiving unit 104. The wireless drawing command receiving unit 104 may be a separate box or unit that plugs into the display.

The wireless drawing command transmitting unit 102 uses the wireless transmitter 122 to transmit drawing commands 140 from the command buffer 112. The drawing commands 140 are also associated with the master image renderer 118 so that the same drawing commands in the same order are sent and used by the wireless drawing command transmitting unit 102 for use by the wireless drawing command receiving unit 104. The wireless drawing command receiving unit 104 is operatively coupled to the drawing command transmitting unit via wireless link 144 provided by the wireless transceivers 122 and 134. The drawing commands 140 are suitably modulated by the wireless transceiver 122 and sent as wireless drawing commands 146 to the wireless transceiver 134. The wireless transceiver 134 includes a wireless receiver that is operative to receive the transmitted drawing commands 146 for storage in command buffer 132. The wireless drawing command receiving unit 104 includes a shadow renderer 148 that in this embodiment is identical to the master renderer 118 so that the same commands are processed in the same order. In addition, the same image is displayed on the two display screens 106 and 138. The drawing command receiving unit 144 transmits drawing command throttle data 148 back to the wireless drawing command transmitting unit 102 to allow the wireless drawing command transmitting unit 102 to throttle transmission of drawing commands that are communicated wireless, namely wireless drawing commands 146. The throttle mechanism ensures that the command buffer 112 does not proceed to the next rendering command, or set of commands, unless both the slave and master renderers are ready to receive the commands.

The drawing command buffer 112 stores drawing commands for the master image renderer 118. The wireless transceiver 122 transmits drawing commands 140 obtained from the command buffer or from any suitable source to the wireless drawing command receiving unit 104. The drawing commands 140 are associated with the master image renderer and are used to render an image stored in frame buffer 124. The first display screen is operatively coupled to the master renderer. The frame buffer may be, for example, dedicated system memory, or memory associated with the wireless drawing command transmitting unit. The local (wired) display screen 106 outputs rendered images from the frame buffer 124 as provided by the master renderer 118.

The command buffer 132 of the wireless drawing command receiving unit 104 is operative to store received drawing commands 146 from the drawing command transmitting unit 102 for use by the shadow image renderer 148. The frame buffer 136 is operatively coupled to the shadow image renderer 148 and finally rendered images are provided to the display screen 138 from frame buffer 136 via the shadow image renderer 148.

In this embodiment, the drawing command transmitting unit 102 includes the drawing control registers 114 that are operatively coupled to the wireless transceiver 122 such that the wireless transceiver transmits both wireless drawing commands and drawing control register status via the wireless link 146 for the shadow image renderer. The drawing control register status is then stored in the control registers 130 of the wireless drawing command receiving unit 104 so that both the drawing command transmitting unit and the drawing command receiving unit 104 have the same control register data so that each of the rendering devices can render the same image at substantially the same time.

Since conventional monitors may use, for example, a monitor identification scheme such as extended display information data (EDID) upon power-up, an LCD panel or other monitor device is queried by a graphics accelerator or other device and returns the display resolution information, monitor type or any other suitable monitor identification information. In this embodiment, the wireless drawing command receiving unit 104 sends monitor identification data, such as EDID information, or any other suitable information on a wireless back channel to the wireless drawing command transmitting unit to identify for the wireless drawing command transmitting unit 102 the type of display screen 138 and the necessary resolution to provide the requisite monitor synchronization information via the wireless transceiver. This detection operation may be optional depending upon the type of system involved.

The master and slave renderers each contain display controllers to refresh images from frame buffers to display screens. These display controllers (not shown) are controlled by control registers 114 and 130. Preferably, both the local and wireless displays are have the same resolution, bit depth and refresh rate. However, refresh rates and timings do not need to match. Bit depths must match. It will be recognized that resolutions need not match if standard virtual desktop systems are used on either display.

The wireless drawing command transmitting unit 102 throttles transmitted drawing commands sent via the wireless link 144 in response to the drawing command throttle data 148 sent from the wireless drawing command receiving unit. Slave command buffer 132 may send status or start/stop data based on available entries in its buffer. If fewer than a high watermark of entries are available then the slave renderer sends stop data. Once the buffer is drained to more than a low watermark, the slave renderer sends start data. Other buffer management techniques may also be used. In addition, packet transmission may be used wherein the wireless transceiver does not acknowledge packets when buffer 132 does not have room more commands. This can reduce use of the back channel.

With the above embodiment using the same graphics accelerators employed by both the master renderer 118 and the shadow image renderer 148, the same command stream is used for both renderers. In this embodiment, typically, no operating system command routing is necessary between the wireless drawing command transmitting unit 102 and the wireless drawing command receiving unit 104.

Figure 1B:
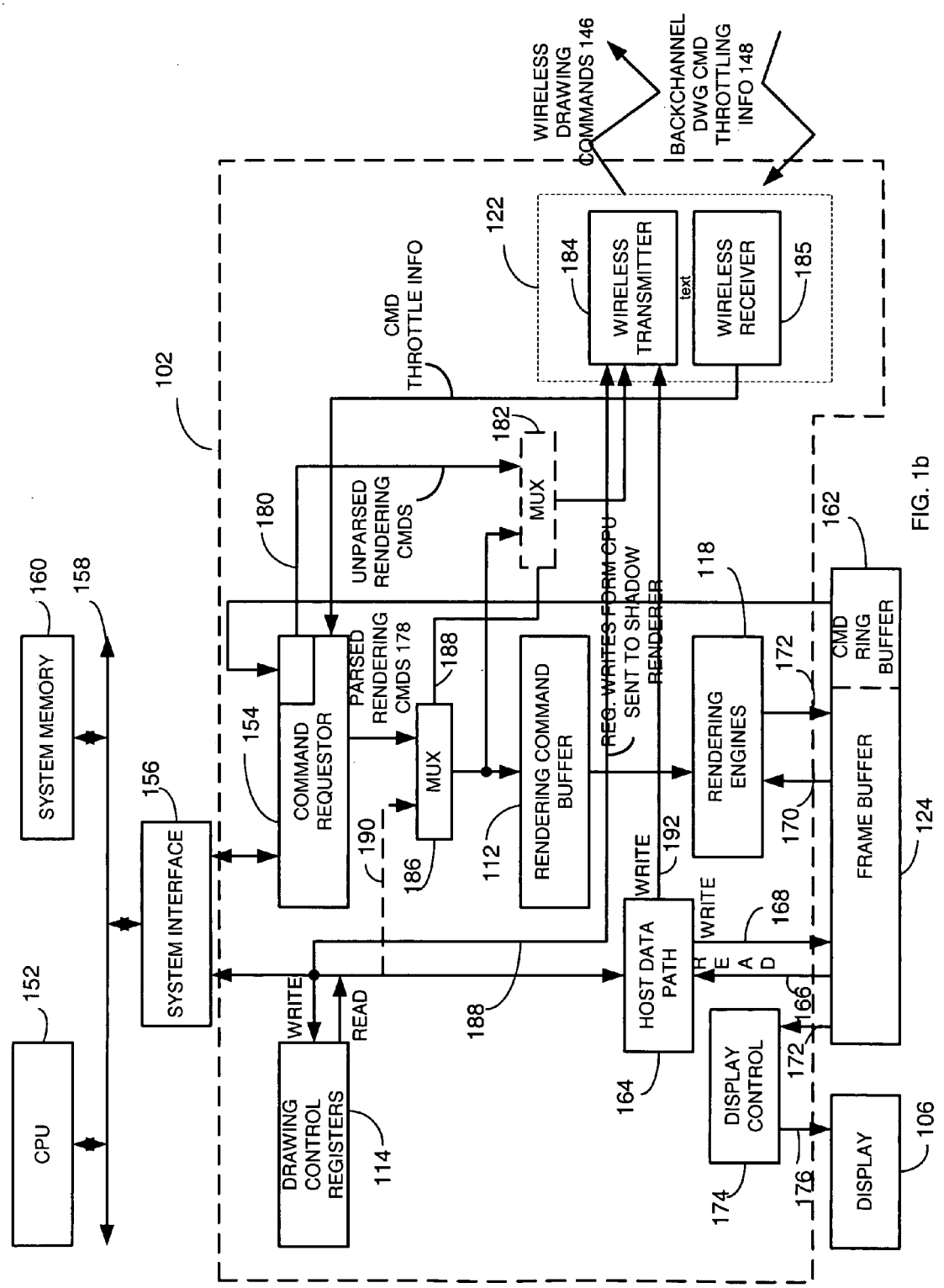
FIG. 1b is a block diagram illustrating one example of a wireless drawing command transmitting unit in accordance with one embodiment of the invention.

FIG. 1b is a block diagram illustrating an example of a wireless drawing command transmitting unit 102, employed with a host CPU 152, which is communicating with a wireless drawing command receiving unit that includes the same image renderer as the master image renderer 118. In this embodiment, a same command stream is used to render images for both the master renderer and the shadow image renderer. In addition, in this embodiment, the same command requester 154 is used for both the master image renderer and the shadow image renderer. System interface 156 provides an interface, as known in the art, between a system bus 158 that is used by the host CPU 152 and system memory 160. Any suitable memory may be used to store commands sent by the host CPU under control of an application, for example. In this embodiment, a portion of frame buffer 124 is used as a command ring buffer 162. However, it will be recognized that system memory may include a suitable command ring buffer, or any other suitable storage mechanism may be used.

Since sometimes the master renderer 118 may not perform drawing commands rendering but instead certain drawing commands may be processed by the host CPU 152, a host data path 164 is provided by the wireless drawing command transmitting unit to allow the host CPU 152 to read and write data to frame buffer 124 as shown by read line 166 and write line 168 which may be performed over a suitable bus. As noted above, the master renderer 118 may include one or more rendering engines such as a 2D and/or 3D rendering engine as known in the art. Accordingly, the master renderer may read data 170 from the frame buffer 124 and write final rendering images 172 to the frame buffer 124. The final rendered image 172 is then output to a display control device such as a CRTC or other suitable device as known in the art and indicated as 174 which then sends the requisite pixel information 176 and synchronization information to display 106 as known in the art.

The command requester 154, as known in the art, requests drawing commands from the command ring buffer 162 or any other suitable location or directly from the system interface when commands are needed by the rendering engine 118. As shown, drawing commands may be parsed rendering commands 178 or unparsed rendering commands 180, depending upon the command format used in the system. As shown, where unparsed commands are understandable by the wireless drawing command receiving unit 104, they may be passed through a multiplexer 182 to the wireless transmitter 184 and sent as wireless drawing commands 146. If parsed rendering commands are needed, parsed rendering commands 178 are passed through multiplexer 186 and sent to the rendering command buffer 112 and also to multiplexer 182. A multiplexer control signal 188 is used to control the multiplexers as needed. Accordingly, multiplexer 182 may output either unparsed rendering commands or parsed rendering commands depending upon the particular command stream needed. In addition, if desired, as shown by dashed line 190, commands from the CPU may also be passed to the rendering command buffer 112 and sent out through the wireless transmitter 184 through multiplexers 186 and 182, if desired.

To insure that drawing control registers are the same in both the master image renderer and the shadow image renderer, the graphics accelerator driver accesses registers in the wireless drawing command receiving unit 104 via wireless transceiver direct access over a wireless channel. Accordingly, the driver being run on the wireless drawing command transmitting unit 102 can read and write registers associated with the shadow image renderer. This is shown by register write data 188 wherein drawing control register writes are provided both to the drawing control register 114 and are also wirelessly sent to wireless transmitter 184 for updating control registers 130. In addition, frame buffer writes controlled by the host CPU, for example, to the host data path 164, are also communicated wirelessly to the shadow image renderer so that the frame buffer 136 appears to be identical to the frame buffer 124. For example, host processor write data 192, which may be the same as write data 168, is also sent wirelessly as a wireless drawing command and a frame buffer write to the wireless drawing command receiving unit. Accordingly, frame buffer reads associated with frame buffer 124 occur for the wireless drawing command transmitting unit only. However, frame buffer writes that are performed by the wireless drawing command transmitting unit to the frame buffer 124 also occur to the frame buffer associated with the shadow image renderer when the system is in a shadow rendering mode. One advantage of this operation is to allow the savings of wireless channel bandwidth and back channel bandwidth for throttling purposes since only writes are communicated to the shadow image renderer automatically when in a shadow rendering mode.

Figure 2:
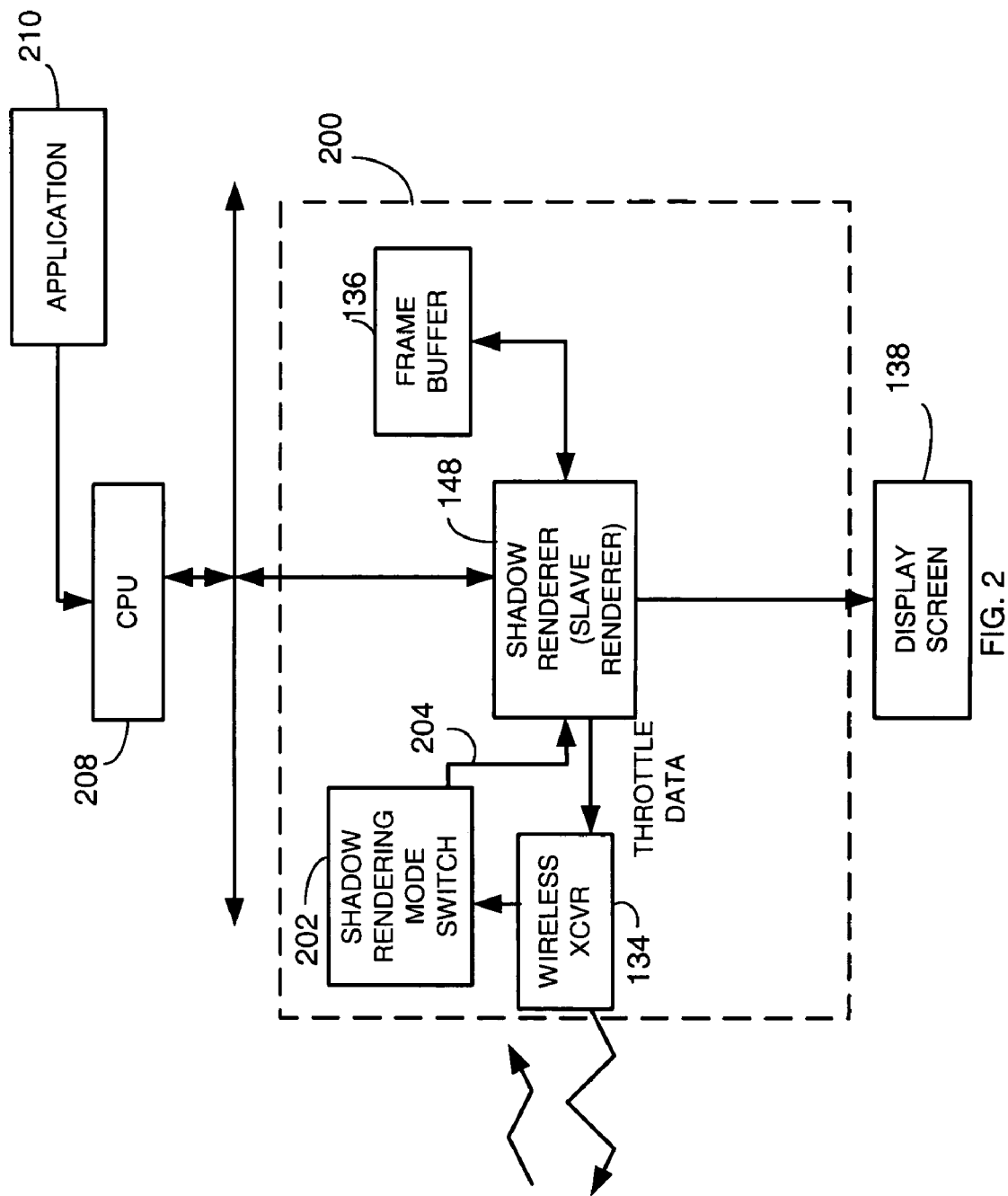
FIG. 2 is a block diagram illustrating one example of a wireless drawing command receiving unit in accordance with one embodiment of the invention.

FIG. 2 illustrates a block diagram of a wireless drawing command receiving unit that is switchable between a shadow image rendering mode and a non-shadow image rendering mode. For example, in this embodiment, a wireless drawing command receiving unit 200 is switchable between a wireless shadow image rendering mode and an independent rendering mode such as if the wireless drawing command receiving unit was part of a host CPU system which executed its own drawing application. With this type of wireless drawing command receiving unit, a system may either simultaneously present the same image on the master display screen and the shadow image display screen or provide different images on the two different screens depending upon whether the shadow mode was in operation.

As shown, the wireless drawing command receiving unit 200 includes a shadow mode switch 202 that may be implemented via hardware or software and may be switched, for example, by a bit or other data sent in a control bit stream or any other bit stream as received from the wireless drawing command transmitting unit to activate remotely the shadow image rendering mode. Alternatively, the shadow mode switch 202 may be activated by a user through a graphic user interface or it may be a hard switch, for example, accessible by a user of the wireless monitor.

In this embodiment, the wireless transceiver 134 receives a shadow mode flag or bit in a wireless control channel to activate the wireless drawing command receiving unit 200 to act as though it is a shadow image renderer so that the same images are presented on both the display screen 106 and the display screen 138. Operation is carried out as previously described. The shadow mode switch 202 generates an activation signal 204 to activate the shadow image renderer so that it knows to obtain information via the wireless link form the master image renderer. If the shadow mode switch is off, the shadow image renderer will obtain rendering commands from a host CPU 208 and an associated drawing application 210, for example, directly, as opposed to the wireless link.

Figure 3:
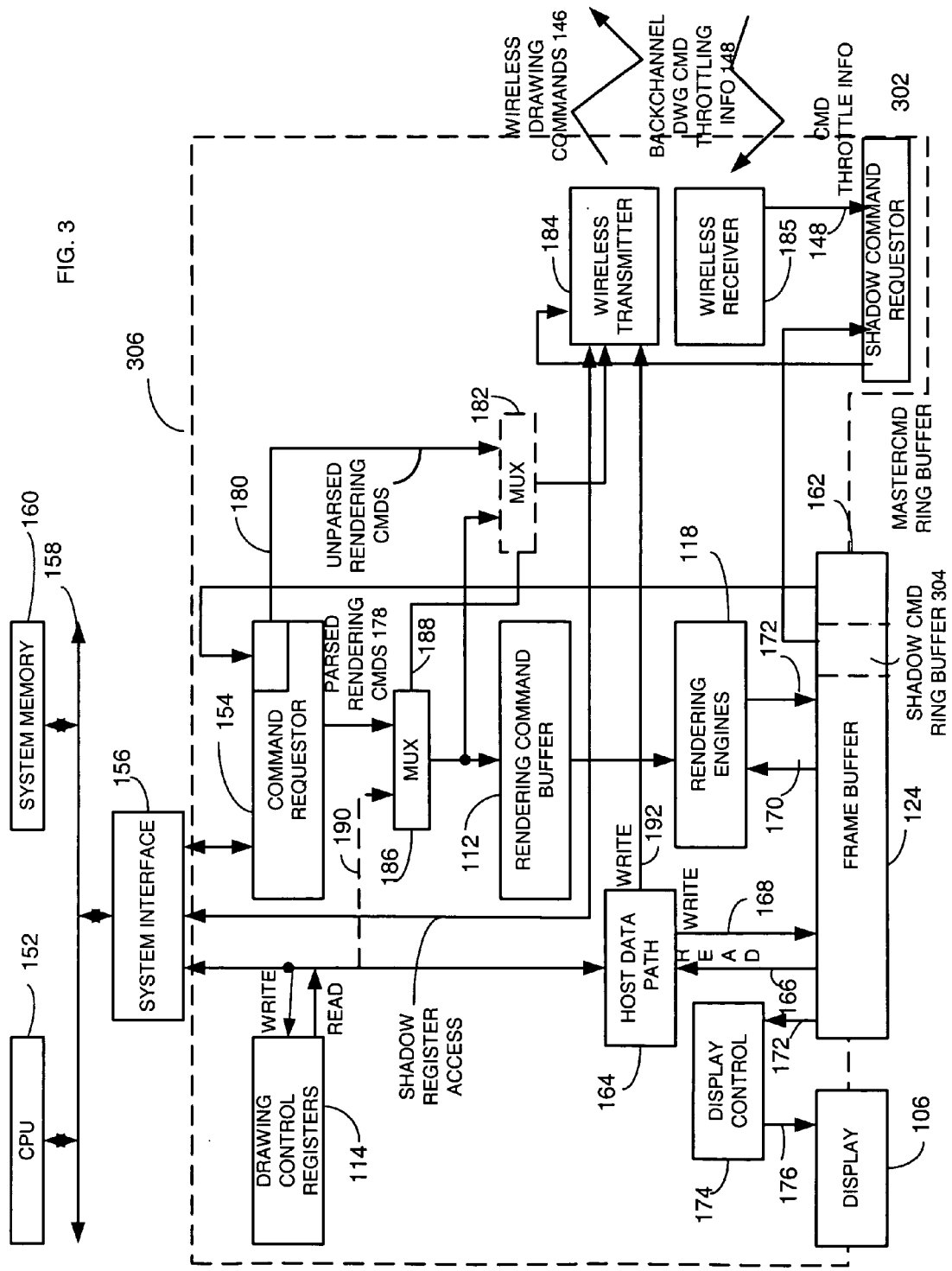
FIG. 3 is another example of a wireless drawing command transmitting unit in accordance with one embodiment of the invention.

FIG. 3 illustrates another embodiment of a wireless drawing command transmitting unit 300 wherein the master image renderer is a different type of image renderer (e.g., different manufacturer, model, speed, etc.) from the shadow image renderer. Accordingly, different command streams are used for the master renderer and the shadow renderer. In this embodiment, separate command requesters 154 and 302 are used such that a separate shadow command requester 302 is used in addition to a master command requester 154. In addition, separate command ring buffers are used so that an additional shadow command ring buffer 304 is used to store drawing commands as used by the shadow image renderer and the command ring buffer 162 stores drawing commands used by the master image renderer. Also as shown, host CPU writes to the frame buffer are not communicated to the shadow image renderer and the frame buffer contents for frame buffer 124 will be different from the frame buffer contents 136. In addition, the wireless receiver 185 receives the back channel command throttling data 148, passes the command throttle information 148 to the shadow command requester 302 to throttle the output of wirelessly communicated commands 308 to the wireless transmitter 184. Accordingly, there may not be one to one correspondence between the content of the remote frame buffers 124 and 136 unlike the embodiment described above with respect FIG. 1b. However, preferably, a software application or driver is aware of the two displays being used.

In another embodiment, different renderers could be used and different commands streams, but the same image is displayed on both displays such that a driver hides the command streams differences or performs translations of commands so that differing renderers could be used.

Figure 4:
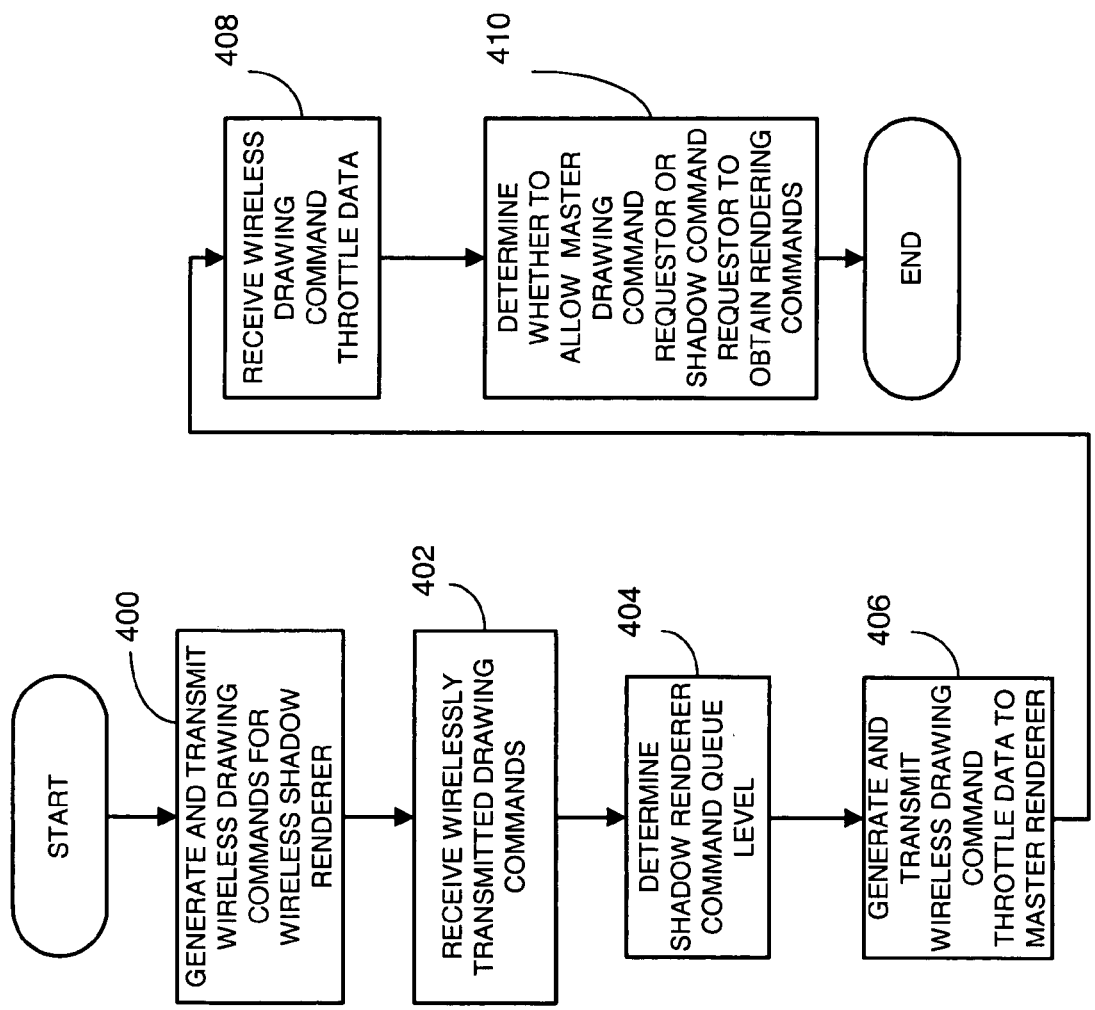
FIG. 4 is a flowchart illustrating a method for providing wireless display of an image in accordance with one embodiment of the invention.

FIG. 4 is a flow chart illustrating one example of a method for providing wireless display of an image that may be carried out by the above embodiments. As shown in block 400, the method includes generating and transmitting wireless drawing commands for a wireless shadow display device as shown in block 400. As shown in block 402, the method includes receiving wirelessly transmitted drawing commands for use by an image rendering engine such as that associated with a shadow image renderer. As shown in block 404, the method includes determining a shadow image renderer command queue level by evaluating, for example, a command read pointer, or watermark levels associated with a shadow image renderer command buffer to determine whether the shadow image renderer requires additional commands or if an overflow is occurring. This is done to determine drawing command throttle data. Where the master image renderer and the shadow image renderer are the same type of (e.g, use same command set) graphics accelerator chips, for example, a master image renderer waits until a shadow image renderer and the master image renderer request the same number of command bytes. For example, either the master image renderer requests commands which are then sent wirelessly or the shadow image renderer requests additional commands be sent via the throttling data in the back channel for a start and stop operation. Alternatively, a specified number of commands can be requested.

As shown in block 406, the method includes generating and transmitting wireless drawing command throttle data to the master renderer to throttle the number of drawing commands sent wirelessly. As shown in block 408, the method includes receiving, such as by the wireless drawing command transmitting unit, the wireless drawing command throttle data. Once received, the wireless drawing command transmitting unit determines the number of commands required to be sent to the shadow image renderer to insure that the same image is being displayed on a wireless monitor. As shown in block 410, the method includes determining whether to allow the master drawing command requester or the shadow command requester to obtain rendering commands. This may occur, for example, where a plurality of differing command requesters are used as part of the drawing command transmitting unit. If, for example, the wireless drawing command throttle data indicates that the shadow image renderer requires additional commands, the shadow command requester will request the suitable number of commands indicated in the throttle data and transmit these commands through the transmitter. If, however, the master image renderer requires commands, the master image requester will provide the requisite number of commands to the command buffer associated with the master image renderer. Accordingly, the above method includes transmitting via a wireless communication link for a first image rendering engine, such as a shadow image renderer, drawing commands associated with a second image rendering engine, such as a rendering engine associated with the master image renderer. The method also includes storing drawing commands for each of the respective image rendering engines such that drawing commands are stored that have been transmitted by drawing command transmitting units for use by a shadow image rendering image.

In addition to wirelessly communicating drawing commands, the method includes wirelessly sending frame buffer write commands to a wireless drawing command receiving unit for writing data to a frame buffer associated with the shadow image renderer, to facilitate the correspondence between remote first and second frame buffers. In addition, the method includes wirelessly transmitting the same control register data generated for a master rendering engine to a wireless drawing command receiving unit for use by a second rendering engine, such as a rendering engine associated with a shadow image renderer.

The above structures and methods provide a wireless monitor and system. Shadow rendering by wireless devices are provided wherein drawing commands are communicated wirelessly to avoid high bandwidth transmission of rendered pixel data to facilitate a wireless link between a monitor, for example, and an image rendering source. In addition, drawing command throttling data is sent form the wireless monitor back to the drawing command transmitting unit to suitably throttle the number of drawing commands as needed by the shadow image renderer to insure, for example, suitable timing of the same image displayed on a plurality of display screens. The operating system and graphics driver may be unaware that the shadow renderer is present in the system, for example if the wireless receiving unit is the exact same type of renderer as the master. The invention may be applicable to many devices that employ a display device. Other advantages will be recognized by those of ordinary skill in the art.

In an alternative embodiment, instead of or in addition to the commands, the wireless display system may wirelessly transmit compressed image frames in the form of a video stream to the unit that wirelessly receives the compressed image frames and decompresses the received image frames for display on a local display. The first unit includes a wireless display circuit that includes a graphics processing circuit, a video decoder, the short range wireless transmitter and a data encoder. In this embodiment, the data encoder is a software data encoder executed on a processor such as a host processor in a computer, communication system or other processor based system.

In an alternative embodiment, the data encoder may be a hardware data encoder such as an integrated circuit and may be co-located on a peripheral printed circuit board along with the graphics processing circuit. In addition, the short range wireless transmitter may be coupled to a USB host but may also be coupled directly to the wireless display circuit and may be resident, for example, on a same integrated circuit as the wireless display circuit or may be on a same printed circuit board as the wireless display circuit.

The wireless display circuit may be, for example, a graphics accelerator chip with standard graphics processing capabilities and video overlay capabilities as known in the art. Accordingly, the graphics processing circuit may be a suitable 2D/3D graphics rendering engine that is operatively coupleable to a frame buffer or any other suitable memory. The graphics processing circuit receives graphics rendering commands from a command buffer to render graphics data based on the rendering commands and stores rendered graphics data in the frame buffer.

The wireless display circuit may also include a conventional video decoder such as an MPEG based video decoder that operates pursuant to the MPEG 2, MPEG 4 standard or any other suitable decoding algorithm. The video decoder receives a compressed video stream from, for example, a compressed video source via a local bus, such as a PCI, AGP or any other suitable bus. The video decoder produces decoded video from the compressed video stream for display on a local display, such as a CRT, LCD display or any other suitable display device. In this particular embodiment, the wireless display circuit also includes a video overlay scaler and a blending circuit. As known in the art, the video overlay scaler suitably scales decoded video and overlays the scaled video with the rendered graphics data to combine the rendered graphics data and video as suitable image frames. A TV out port converts digital image data into analog TV out signals, such as compliant with the ITU-656 standard or any other suitable standard. The wireless display circuit also includes a video capture port that receives decoded video from a suitable video source, such as another MPEG decoder, analog decoder or ITU-656 interface, and stores the captured video as decoded video in the frame buffer.

The wireless display circuit also includes a multiplexing circuit that is operatively coupled to an output of the blending circuit to receive image frames that are produced by blending rendered graphics data and decoded video. The multiplexing circuit is also operatively coupled to receive digital video for the video capture port such as from any suitable source. The multiplexing circuit is then controlled via a control register via one or more control bits. The control register stores wireless display select control bits which indicate whether a wireless display mode has been selected.

If the wireless display mode has been selected, the control bits will control the multiplexer to select the output frames from the blending circuit to be input to the video capture port which stores decoded video (with graphic) frames in the frame buffer. In this embodiment, since as known in the art a video capture port can write to the frame buffer, an additional memory writing circuit may not be necessary.

The data encoder, in this example, is a software data encoder, that is executed by suitably programmed processor that is operatively coupled to the frame buffer via the local buses. These buses are considered local since they physically connect the various blocks. In this example, the data encoder carries out MPEG encoding on the image frames output by the blending circuit and stored via the video capture port during the wireless display select mode. Accordingly, the data encoder encodes the rendered graphics data and the decoded video that have been suitably blended to produce compressed image frames containing recompressed video with encoded graphics data. Since the compressed video was decompressed via video decoder, the video retrieved for the overlay scaler has already been decoded once. Accordingly, the data encoder recompresses the video (and compresses the rendered graphics data since it is in the same stream as the video). The data encoder is operatively coupled also to the short range wireless transmitter, in this embodiment, through local bus and USB host. The short range wireless transmitter transmits the encoded rendered graphics data and recompressed decoded video which is in the form of suitable modulated compressed frames to a short range wireless receiver in the second unit.

The data encoder may also be a hardware-based MPEG encoder that is operatively coupled to the frame buffer 124 via local bus and suitably encodes the image frames output by the blending circuit after they have been multiplexed to the video capture port and stored in the frame buffer. The data encoder is then suitably coupled to the short range wireless transmitter 122 via a local bus and the USB host.

The wireless transmitter may be part of a wireless short range transceiver compliant with the Bluetooth standard and may utilize, for example, a 750 kilobit/sec stream. This may occur, for example, where the data encoder is an MPEG 4-based encoder and accordingly, a Bluetooth-compliant transceiver may be employed. However, where an MPEG2 data encoder is used as the data encoder 110, a resulting bit stream may be on the order of 5 Mbits/sec. Accordingly, the short range wireless transmitter should be IEEE 802.11 compliant. It will be recognized that any suitable short range transceiver may be used depending upon the level of compression provided by the data encoder. The short range wireless transceiver typically has a range of no more than 100 meters. However, it will be recognized that any suitable short range transceiver may be used that are compliant, for example, with any suitable protocols such as, but not limited to, IEEE 802.11, Bluetooth, Home RF standards, or any other suitable design criteria.

The second unit, in addition to including the local display, includes a second frame buffer, the short range wireless receiver and a video decoder that is operatively coupled to the short range wireless receiver and to the second frame buffer and produces decoded video from the received encoded rendered graphics data and recompressed decoded video. Once the decoded image frames are stored in the frame buffer, a CRT controller or other suitable circuitry obtains the image frames and displays them on the second local display.

The short range wireless receiver is preferably a companion receiver to the short range wireless transmitter so that the modulation and demodulation of these transmitters and receivers are fully compliant. Accordingly, the short range wireless receiver may be, for example, of a type compliant with IEEE 802.11, the Bluetooth standard, the Home RF standard or any other suitable short range wireless protocols and/or standards.

The video decoder may be a hardware-based MPEG2, MPEG4 or any other suitable decoder, either in hardware form or may be a software routine executing on a suitably programmed processor that is operatively coupled to the frame buffer through a local bus.

The first unit and second unit may be any suitable devices such as laptop computers, Internet appliances, handheld devices, or any other suitable devices. Moreover, the second unit may simply be a monitor having a circuit board containing the short range wireless receiver, video decoder, frame buffer, CRTC operatively coupled to a display array so that the second unit may be a wall mounted display device or a light weight, portable display. In addition, the first unit may also be a simple portable display device having a local display which may display the same image frames as the receiving unit. It will be recognized that the first unit and the second unit may be employed as larger or smaller devices or systems as the application requires.

By way of illustration, if a 2.5 gigahertz local area network short range communication system is employed with a peak data rate of 11 Mbits/sec, and the local display of the second unit has a resolution of 1024 pixels by 768 pixels, and assuming a 30 frame per second display rate, it is desirable to have the data encoder compress below 0.3 bits per pixel which would result in approximately a 7.1 Mbit/sec stream using an MPEG II, MPEG 4 or JPEG 2000 compression scheme or other suitable compression scheme.

The video capture port effectively captures the combined graphics and video overlay frame as a YUV422 format stream and stores the resulting frames in the frame buffer. The CPU-based data encoder (such as an MPEG2 compressor) reads the frame buffer and generates a 5 Mbit/sec MPEG2 compliant bit stream that is sent over the USB to the short range wireless transmitter, such as a 2.5 gigaherz modulator. Alternatively, if the short range wireless transmitter is resident on the same printed circuit board or integrated circuit as the graphics processing circuit, the CPU-based data encoder can send the 5 megabit per second MPEG2 compliant bit stream over the local bus back to the wireless display circuit for output on the short range wireless transmitter.

With the alternative embodiment of having the hardware data encoder, an advantage arises by not requiring a host CPU to spend processing time re-encoding the video stream. Another advantage of having the short range wireless transmitter on the same printed circuit board and/or integrated circuit as the wireless display circuit, can reduce the bandwidth requirements on the local bus which may have other peripherals communicating thereon. This configuration can result in a potentially faster system.

A method for providing image data for a wireless display such as the local display on the second unit is carried out by the first unit. However, it will be recognized that any suitable hardware or software may be used and that any of the following steps may be carried in any suitable order. In this example, the method will be described with reference to a data stream in which no video is present. For example, where conventional word processing programs are used, and/or 3D games are being rendered by the graphics processing circuit, the resulting stream that is encoded may not include video from a video source that provides compressed video.

In this example, the graphics processing circuit processes rendering commands from the command buffer to produce rendered graphics image data. The method includes storing the rendered graphics image data to the frame buffer. The method includes retrieving the rendered graphics image data from the frame buffer over a local bus, using a second processor, such as the host CPU or other suitable processor. The method includes encoding by the second processor, the retrieved rendered graphics image data to produce encoded graphics image data. The method includes sending the encoded graphics image data, such as via the short range wireless transmitter, to a wireless display, using the short range wireless transceiver.

Where the compressed frames that are sent via the short range wireless transmitter include both graphics and video information, the method includes receiving the compressed video stream, such as from a DVD, cable link, satellite link or any other suitable source, and decompressing the compressed video stream to produce a decompressed video stream. Accordingly, the video decoder decompresses the compressed video stream to produce the decompressed video stream. The method includes storing the decoded video frames in the frame buffer. The method includes retrieving, such as by the wireless display circuit, both the rendered graphics data stored in the frame buffer and the decoded video stored in the frame buffer for combining by the blending circuit. Accordingly, the method includes, combining (blending) the rendered graphics image data with the decompressed video stream to produce frames of image data. This is done, for example, by the blending circuit. The method includes storing the resulting frames of image data in the frame buffer prior to recompressing the resulting frames of image data. This may be done, for example, by activating the multiplexing circuit via the wireless display select bits so that the video capture port captures the frames of image data and stores the frames of image data in the frame buffer.

The method includes retrieving the frames of image data from the frame buffer, such as by the data encoder, and compressing the frames of image data into a video stream such as an MPEG2 or MPEG4 compliant video stream. Accordingly, the originally compressed video is effectively recompressed to produce recompressed video stream when the recompressed video stream includes the encoded graphics information that was blended with the decoded video information by blending circuit. Once the frames of image data have been compressed by the data encoder, the method includes sending the compressed image frames to the wireless monitor using the short range wireless transmitter.

The resulting frames of image data output form the blending circuit may also be displayed on the local display after storage in the frame buffer by a CRTC, (not shown) or any other suitable display logic, as known in the art.

Once the compressed, the frames with the recompressed video and encoded graphics data are transmitted via the short range wireless transmitter, and the second unit uses the short range wireless receiver to receive the compressed frames. The compressed frames are in the form of a compressed video stream that contain graphics data and recompressed video. The video decoder then decompresses the received compressed video stream and produces decompressed image frames and stores them in the second frame buffer. The CRTC then outputs the decompressed image frames from the second frame buffer and causes the second local display to display the decompressed image frames on the second local display.

An alternative embodiment of a wireless display circuit includes a switch and a FIFO memory along with memory controller to store the image frames into the frame buffer. Accordingly, this embodiment does not require using the video capture port. Hence, the video capture port is not unnecessarily tied up during the wireless display select mode. The memory controller may be a conventional memory controller that reads the stored data from the FIFO in a bursty manner, as desired. The wireless display select bits are still used to activate switch which passes the output image frames from the blending circuit to the FIFO during the wireless display select mode. When the wireless display select mode is not activated, the switch disallows storage of the image data into the FIFO. Other advantages will be recognized by those of ordinary skill in the art.

The short range wireless transmitter may be located on a peripheral card containing a graphics processor, such as a wireless display circuit, along with the frame buffer. Accordingly, a USB host is not required to transmit the compressed graphics data and/or video stream.

An alternative embodiment includes a set top box having a wireless display receiver that contains the short range wireless receiver which provides the decompressed information to a high definition television. The wireless display receiver may be, for example, a printed circuit board containing the requisite functional blocks previously described including the frame buffer, the wireless receiver and in addition a graphics processor to perform graphics rendering with a hardware video decoder and a resident CPU. Associated memory is used by the CPU during boot-up. The local display in this example is a high definition television. Accordingly, the wireless display receiver may be incorporated as part of a set top box or other device that is operatively coupled to a high definition television. The receiver carries out the same operations as previously described. With the second processor co-located with the graphics processor, a stand alone-type short range wireless device is created.

As set forth herein, a wireless monitor system is disclosed wherein cabling from an image source to the monitor is eliminated. This may be desirable for LCD projectors, wall displays, handheld devices, or any other suitable devices. The rendered graphics that results from the rendering using rendering commands may be compressed and sent, and/or combined video and graphics frames may be compressed wherein the video was previously compressed and then again recompressed by the disclosed methods and apparatus.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A wireless display device system comprising:
    (a) a wireless drawing command transmitting unit having a wireless transmitter operatively coupled to transmit drawing commands associated with a master image renderer; and
    (b) a wireless drawing command receiving unit, operatively coupled to the drawing command transmitting unit via a wireless link, that includes a wireless receiver operative to receive the transmitted drawing commands and to transmit drawing command throttle data back to the wireless drawing command transmitting unit to throttle transmission of drawing commands communicated wirelessly.

2. The system of claim 1 wherein:
   the wireless drawing command transmitting unit includes a master image renderer; and a first drawing command buffer operative to store drawing commands for the first drawing command buffer; and wherein
   the wireless drawing command receiving unit includes a shadow image renderer; and
   a second drawing command buffer operative to store received drawing commands from the drawing command transmitting unit for use by the shadow image renderer.

3. The system of claim 1 wherein the wireless drawing command transmitting unit wirelessly sends first frame buffer write commands to the wireless drawing command receiving unit for writing data to a second frame buffer to facilitate a correspondence between remote frame buffers.

4. The system of claim 3 wherein the wireless drawing command transmitting unit wirelessly transmits the same control register data generated for the first renderer to the wireless drawing command receiving unit for the second renderer.

5. The system of claim 3 wherein the wireless drawing command transmitting unit wirelessly transmits different control register data generated for the first renderer to the wireless drawing command receiving unit for the second renderer to facilitate independent configuration of the wireless drawing command receiving unit.

6. A wireless device comprising:
   a wireless drawing command receiving unit, that includes:
      a wireless transceiver operative to receive wirelessly transmitted drawing commands from a wireless drawing command transmitting unit; and
      a shadow image renderer, operatively coupled to wireless transceiver, and operative to generate drawing command throttle data to transmit drawing command throttle data back to the wireless drawing command transmitting unit to throttle transmission of drawing commands communicated wirelessly.

7. The device of claim 6 further including:

a drawing command buffer, operatively coupled to the shadow image rendering unit, and operative to store received drawing commands, for use by the shadow image renderer;

a frame buffer operatively coupled to the shadow image renderer; and a display screen operatively coupled to the shadow image renderer to output rendered images from the frame buffer.

8. A wireless device comprising:

a wireless drawing command transmitting unit having a wireless transmitter operatively coupled to transmit drawing commands associated with a master image renderer; and a command requestor operatively responsive to wirelessly communicated drawing command throttle data to throttle transmission of drawing commands communicated wirelessly via the wireless transmitter.

9. The device of claim 8 including a master image renderer; and a first drawing command buffer operative to store drawing commands for master image renderer.

10. The device of claim 9 wherein the wireless drawing command transmitting unit wirelessly sends first frame buffer write commands to a wireless drawing command receiving unit for writing data to a second frame buffer to facilitate a correspondence between remote frame buffers.

11. The device of claim 10 wherein the wireless drawing command transmitting unit wirelessly transmits the same control register data generated for the first renderer to a wireless drawing command receiving unit containing a second renderer.

12. A method for providing wireless display of an image comprising:

receiving wirelessly transmitted drawing commands for use by a first image renderer; and transmitting drawing command throttle data back to a wireless drawing command transmitting unit, to throttle transmission of drawing commands communicated wirelessly.

13. The method of claim 12 including the step of transmitting, via a wireless communication link for the first image renderer, drawing commands associated with a second image renderer.

14. The method of claim 13 including the step of prior to the step of receiving wirelessly transmitted drawing commands, storing drawing commands for the second image renderer; and also including the step of storing received drawing commands from the drawing command transmitting unit for use by the first image renderer.

15. The method of claim 14 including the step of wirelessly sending first frame buffer write commands to a wireless drawing command receiving unit for writing data to a second frame buffer to facilitate a correspondence between remote first and second frame buffers.

16. The method of claim 12 including the step of wirelessly receiving recompressed video for display.

17. The method of claim 15 including the step of wirelessly transmitting the same control register data generated for the first renderer to the wireless drawing command receiving unit for the second renderer.

* * * * *